March 4, 1952 A. W. COURTIS ET AL 2,587,970

APPARATUS FOR PLACING A PICKUP ON A RECORD
AT A PRESELECTED POSITION

Filed March 14, 1949 2 SHEETS—SHEET 1

INVENTORS
ARTHUR WILLIAM COURTIS
KENNETH GEORGE DOUGLAS HALLETT
BY
Walter P. Huntley
Attorney INVENTORS
ARTHUR WILLIAM COURTIS
KENNETH GEORGE DOUGLAS HALLETT
BY Walter P. Huntley
Attorney Patented Mar. 4, 1952

2,587,970

UNITED STATES PATENT OFFICE 2,587,970

APPARATUS FOR PLACING A PICKUP ON A RECORD AT A PRESELECTED POSITION

Arthur William Courtis and Kenneth George Douglas Hallett, Brixton, London, England Application March 14, 1949, Serial No. 81,286
In Great Britain March 11, 1948

5 Claims. (Cl. 274—1)

This invention relates to apparatus for placing the pick-up of a sound reproducing device on a rotating record at any pre-selected position thereon. Apparatus of this nature is used, for example, in theatres and in broadcasting studios for reproducing at a chosen time a particular part of the sound track of a record.

Heretofore it has been the practice to mount the pick-up so that it can be traversed across the record in a direction transverse to the grooves of the sound track and so that it can be raised and lowered. The pick-up mounting has been provided with a scale so that the pick-up could be moved to any pre-selected position before being released to allow it to come into contact with the rotating record, the pick-up being released at the instant when the reproduction of the required part of the record is to begin.

In the operation of this type of apparatus, the record is played in the usual manner and the operator listens to the reproduction and notes the scale reading which indicates the position of the pick-up at the beginning of the required passage on the sound track. Subsequently, to reproduce the desired passage, the pick-up is moved to the selected position and is brought into engagement with the record at the instant when the reproduction is to begin. Such arrangements have three main disadvantages; firstly the pick-up may be released when the rotating record is in any angular position and this has the result that the pick-up may engage the track at any point in a revolution so that the sound track reproduced may commence at an undesired point of a complete revolution of the record. Secondly, since the grooves of the sound track form a spiral, the stylus of the pick-up may fall on a ridge between two grooves with the consequent possibility of subsequently moving into the wrong groove. Thirdly, in spite of the care taken in the production of records, many of them have a central hole for the turntable shaft which is slightly eccentric with respect to the sound-track grooves. This does not effect the normal playing of the record but it does result that if pick-up is allowed to fall onto the record from a pre-selected position above the turn-table the particular groove which the stylus engages will depend on the angular position of the record at the time of release of the pick-up.

According to this invention, an apparatus for placing the pick-up of a sound-reproducing device on a rotating record at any pre-selected position thereon comprises means for adjusting the position of the pick-up in a direction transverse to the direction of travel of the record, a device for indicating that position and means actuated by the rotating record or the drive thereof for bringing the pick-up into contact with the record when the latter is in a pre-selected angular position. By this arrangement the stylus of the pick-up will always engage the required groove at a particular position in the groove thus ensuring that the sound reproduction commences at exactly the required point and also eliminating any possibility of the stylus engaging with the wrong groove.

There may be provided means actuated by the rotating record or the drive thereof for lifting the pick-up out of engagement with the record when the latter is in pre-selected angular position. Thus the operator, by listening to a record to determine the particular part of the sound track required, is able to remove the pick-up at a desired point and then not only knows from the indicator the position of the pick-up but also knows the angular position of the record when the pick-up was removed. Thus it is possible subsequently to set the apparatus to commence reproduction exactly at the chosen point.

The following is a description of one embodiment of the invention, reference being made to the accompanying drawings in which Figure 1 is a diagrammatic plan view of the pick-up arm and its associated position indicator;

Figure 1:
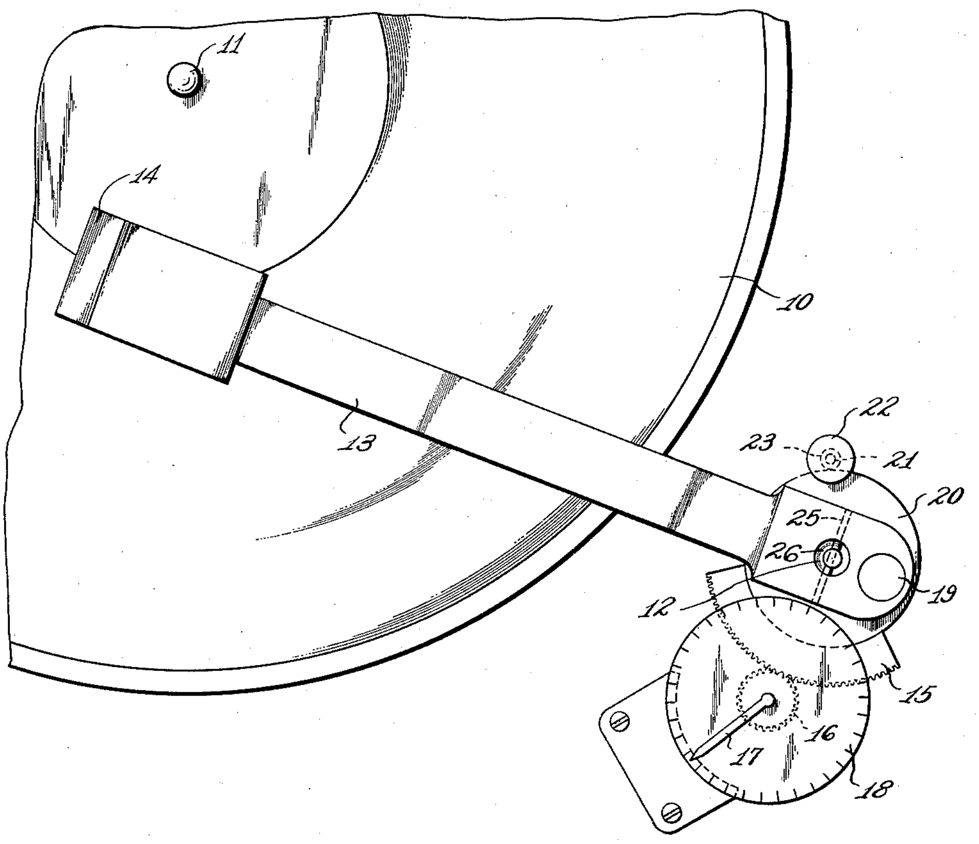

Referring to Figure 1 the record carrying turntable 10 is mounted on an upright spindle 11 which is driven in the conventional manner. For reasons however which will become apparent hereinafter, the turntable 10 is keyed to the shaft 11 so that it will always bein a fixed angular position relative to the shaft. Pivotally mounted on a base 6 at one side of the turntable 10 as by means of a bushing 7 and ball thrust bearing 8 is an upright shaft 12 carrying the pick-up arm 13 so that as the pick-up 14 moves across the record, i. e. from the outside to the inside or vice-versa, the shaft 12 rotates. This shaft by a ten to one step-up gearing represented by the toothed sector plate 15 and the pinion 16 secured to a pinion shaft 24 drives an indicating device comprising pointer 17 which traverses a circular scale 18 which is for convenience, arbitrarily calibrated in degrees. The ten to one gearing is chosen so that with usual dimensions of records etc. the pointer will travel approximately a full circle as the pick-up moves from the outside to the inside of a record.

Figure 4:
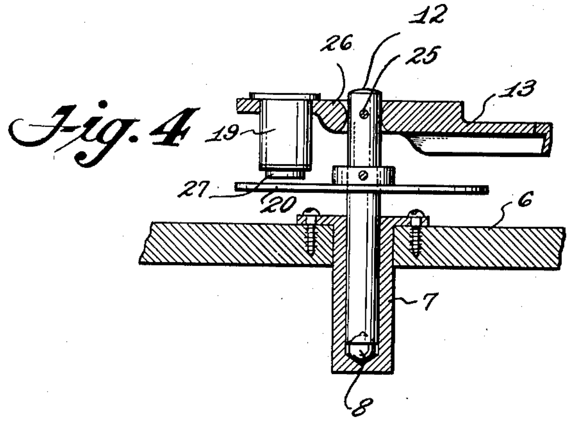
Figure 4 is a fragmentary sectional view similar to Figure 3, but illustrating the construction of the electromagnetic lifting means.
Figure 5:
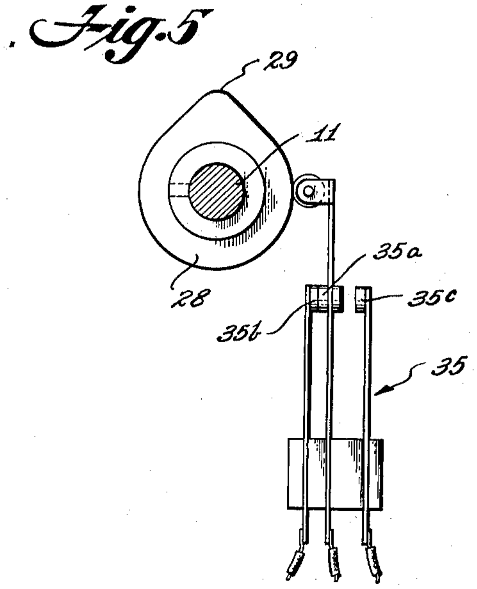
Figure 5 is a fragmentary horizontal sectional view illustrating the construction of a cam-operated switch mechanism.

The pick-up arm 13 is mounted on the shaft 12 by a cross pin 25 so that it can pivot about a horizontal axis passing through the shaft 12, so allowing the pick-up to be lifted out of engagement with the record when required, the weight of the pick-up normally keeping it in engagement with the record. The end of the arm remote from the pick-up 14 extends beyond the horizontal pivot axis as shown at 26 in Fig. 4 and carries an elevator which may comprise an electro-magnet 19 which has a pole face 27 co-operating with a steel armature 20 mounted on the shaft 12 below the magnet. In the normal operating condition a current is passed through the magnet of such strength that, if the pick-up arm has been lifted out of engagement with the record, and hence the pole face 27 is close to the armature 20, the attractive force between the two will be sufficient to hold the pick-up arm in this position. If the pick-up is, however, in engagement with the record, the pole face 27 is further from the armature 20 and this normal energising current is not sufficient to lift the pick-up off the record.

On the drive spindle 11 of the turntable 10 is secured a cam 28 having one lobe 29 arranged to operate a double throw switch 35 for a short period once during each revolution of the spindle. This switch has a single movable contact 35*a* which normally makes one circuit through one fixed contact 35*b* but which is moved by the cam lobe 29 over to another fixed contact 35*c* so breaking the first circuit and making a second circuit.

Figure 2:
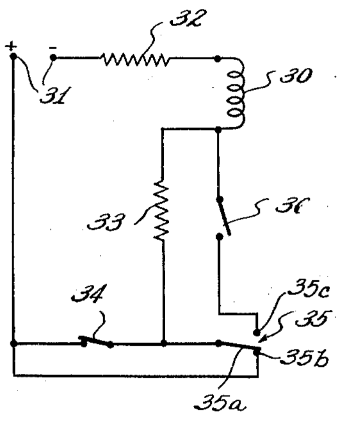
Figure 2 is a circuit diagram of the apparatus.
Figure 3:
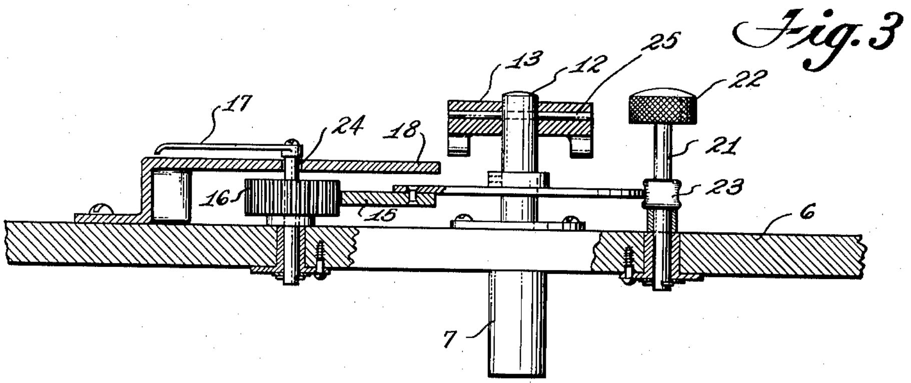
Figure 3 is a fragmentary vertical sectional view illustrating the arrangement of the position indicating device and the means for moving the pick-up across the record.

Referring to Figure 2, the circuit for energising the solenoid coil 30 from the two power input terminals 31 comprises in series, a resistor 32, the coil 30 of the electro-magnet 19, a second resistor 33, and a normally closed push button switch 34. Connected across the contacts of the normally closed switch 34, which will be called the "drop" switch for reasons which will hereinafter be apparent, are the normally closed contacts 35*b* of the cam operated switch 35, the movable contact 35*a* of this switch being connected to that side of the drop switch 34 which is connected to the resistor 33. In shunt across the resistor 33 is a circuit comprising, in series, a push-button switch 36 having normally open contacts (hereinafter known as the "lift" switch) and the normally open contacts 35*c* of the cam operated switch 35.

It will be seen that in the normal condition, the energising current for the magnet coil 30 passes through both resistors 32 and 33 and the circuit is completed by both the drop switch 34 and the cam-operated switch contact 35*b*. The two resistors are chosen to limit the energising current to the value such that the magnet can hold the pick-up out of engagement but cannot lift it out of engagement. With the contacts of the drop switch 34 closed and the contacts of the lift switch 36 open, it will be seen that operation of the cam operated switch 35 will not alter the current through the magnet. The rotation of the cam 28 will, for a short time during each revolution of the spindle 11, open the contacts 35*b* in shunt across the drop switch 34. Hence if the drop switch 34 is operated, as soon as the cam switch contacts 35*b* open, the circuit to the magnet coil 30 will be broken, so interrupting the holding current and allowing the pick-up to drop onto the record. It will be particularly noted that the pick-up will engage the record when the spindle 11 is in the particular angular position in which the cam opens the switch contacts 35*b* and not at the exact instant of operating the drop switch 34.

If, on the other hand, the lift switch 36 is operated, the subsequent operation of the cam switch and the closing of contacts 35*c* will short circuit the resistor 33 so increasing the current through the magnet coil 30. The values of the two resistors are so proportioned that the increased current due to the shorting of the resistor 33 is sufficient to lift the pick-up off the record. Hence, after the lift switch 36 is operated, the pick-up will be lifted off the record as soon as the spindle has reached the angular position in which the normally open cam switch contacts 35*c* close. It will again be noted that the pick-up is lifted, not at the instant of operation of the lift switch 36, but at the instant when the cam switch 35 is operated i. e. when the spindle 11 is in a predetermined angular position.

The use of this apparatus to be described hereafter comprises two distinct steps; firstly playing the record to determine the position at which the required part of the sound track begins, and secondly the subsequent reproduction of this part of the sound track. It will be seen that with this apparatus, once the initial determination has been made, the record may be removed from the turntable and can at any time be replaced and required passage reproduced without any further calibration, provided a record has been kept of the required pick-up position.

For the initial calibration, the record is arbitrarily provided with a single mark on its periphery and is put on the turntable with this mark aligned with a mark on the periphery of the turntable. As explained earlier, the turntable 10 is keyed to its spindle 11 so that the mark on the turntable is in some fixed angular position relative to the cam. The record is played in the usual manner for the operator to listen to it. During this time, as the pick-up 14 moves towards the centre of the record, the indicator pointer 17 traverses its scale 18, possibly with an irregular motion due to the eccentricity of the grooves on the record.

The operator presses the lift switch 36 as soon as the required passage commences and holds it down until the pick-up lifts due to the operation of the cam switch 35 which is possibly a fraction of a second later. The lift switch 36 can then be released, as the normal magnet current will hold the pick-up off the record. The indicator reading is then noted. This reading gives the position of the pick-up arm at the first operation of the cam switch after the lift switch 36 was pressed.

At any subsequent time, the record can be put on the turntable with the appropriate marks aligned and the pick-up arm moved manually until the indicator reading corresponds to that previously noted. Then, when the required passage is to be reproduced, the drop switch 34 is pressed. The pick-up will then drop on to the record as soon as the cam switch 35 is operated, thus ensuring that the record is in the same angular position when the pick-up falls as it was when the pick-up was lifted. As explained before, this removes any possibility of the stylus engaging the wrong groove.

For some purposes this simple method of operation which ensures that the stylus drops into an arbitrary fixed position in a known groove may be adequate. However, it is often desired to select a particular angular position in the groove. This may be done in the following way. Instead of having a single mark on the turntable a number of marks, for example, four, are provided uniformly spaced around the periphery. The record is initially aligned with one of these marks and is played in the usual manner. If it is found that the pick-up lifts too late, say a quarter of a revolution after the commencement of the required passage, the record is moved on the turntable through 90° so that the record mark is aligned with another one of the four turntable marks. Since the pick-up lifts when the cam is in a predetermined angular position, it will now lift at a position on the record which is 90° from the previous position. It will be found in practice that an adjustment to an accuracy of a quarter of a revolution is quite adequate for almost all purposes but it will be appreciated that much greater accuracy of adjustment can be obtained by this method. When the required passage is to be reproduced it is necessary to align the record with the proper one of the four turntable marks and then proceed as before.

For adjusting the pick-up arm to a selected indicator reading, it is preferable to provide a slow-motion drive. In one such arrangement, the armature 20 of the solenoid is made in the form of a disc and secured to the shaft 12. Adjacent the periphery of this disc another upright shaft 21 is journaled for rotation on the base 6 and fitted with a knob 22 for manual operation. A felt or rubber roller 23 engages the edge of the disc 20 to give a friction drive to the periphery of the disc. Since the armature 20 is fixed to the shaft 12 carrying the pick-up arm 13, rotation of the knob 22 will move the pick-up arm and simultaneously traverse the pointer 17 over the scale 18.

It will be appreciated that the cam-operated switch 35, might be replaced by a relay controlled by a photo-cell which is responsive to a mark made on the record. In this case it is no longer necessary to have the turntable keyed to the shaft 11.

We claim:

1. An apparatus for placing the pickup of a sound reproducing device on a rotating record at any preselected position thereon comprising a drive means for rotating said record, elevator means actuatable to lower said pickup into contact with said record and operable to lift said pickup out of engagement with said record, actuating means connected to said elevator means and operable by said drive means in a predetermined angular position of said record to actuate said elevator and lower said pickup when said record is in said predetermined angular position, and control means connected between said actuating means and said elevator means and enabled by operation of said actuating means to operate said elevator and lift said pickup out of engagement with said record when said record is in said predetermined angular position.

2. An apparatus for placing the pickup of a sound reproducing device on a rotating record at any preselected position thereon comprising a drive means for rotating said record, an electromagnet adapted when energized to hold said pickup out of engagement with said record, a source of power for energizing said magnet, a pair of normally closed contacts connected in series with said source and said magnet, actuating means operated by said drive means in a predetermined angular position of said record for opening said contacts for a short period during each revolution of said record whereby said pickup can move into engagement with said record only when said record is in said predetermined angular position, a pair of normally open contacts operatively associated with said actuating means to be closed thereby for a short period during each revolution of said record, and a manually operable normally open lift switch connected between said source and said magnet in series with said normally open contacts.

3. An apparatus for placing the pickup of a sound reproducing device on a rotating record at any preselected position thereon comprising a drive means for rotating said record, an electromagnet adapted when energized to hold said pickup out of engagement with said record, a source of power for energizing said magnet, a pair of normally closed contacts connected in series with said source and said magnet, actuating means operated by said drive means in a predetermined angular position of said record for opening said contacts for a short period during each revolution of said record whereby said pickup can move into engagement with said record only when said record is in said predetermined angular position, a pair of normally open contacts operatively associated with said actuating means to be closed thereby for a short period during each revolution of said record, a manually operable normally open lift switch connected between said source and said magnet in series with said normally open contacts, a manually operable normally closed drop switch connected in parallel with said normally closed contacts whereby the circuit connecting said magnet to said source may be interrupted only when said manually operable drop switch has been opened, and means connected at one end to said magnet and connected in shunt with said lift switch and in series with said drop switch for maintaining said pickup in any position in which it may be placed by operation of either of said switches until the other of said switches is operated and despite restoration of either of said switches to their normal positions.

4. An apparatus for placing the pick-up of a sound reproducing device on a rotating record at any preselected position thereon comprising means for moving said pick-up in a direction transverse to the direction of travel of said record to any desired position, a position indicating device for indicating the position of said pick-up relative to said record, an electro-magnet adapted when energized to hold said pick-up out of engagement with said record, a source of power for energizing said magnet, a normally closed control switch connected in series with said source and said magnet, means operated by rotation of said record for opening said control switch for a short period during each revolution of said record whereby said pick-up can move into engagement with said record only when said record is in the angular position in which said control switch is opened, a manually operable normally closed switch, a circuit connecting said switch in parallel with said normally closed control switch whereby the circuit connecting said magnet to said source is interrupted by said control switch only when said manually operable switch has been opened, current-limiting means connected between said source and said magnet for normally limiting the current energizing said magnet to a normal value such that said magnet can hold said pick-up out of engagement with said record but cannot lift said pick-up from said record, and means for momentarily increasing said current above said normal value when said pick-up is to be moved out of engagement with said record.

5. An apparatus according to claim 4 wherein said means for momentarily increasing said current includes a pair of contacts connected in circuit with said current-limiting means together with a contact-closing mechanism operated by rotation of said record to close said contacts once during each revolution of said record whereby said pick-up can be moved out of engagement with said record by said magnet only when said record is in a preselected angular position.

ARTHUR WILLIAM COURTIS.
KENNETH GEORGE DOUGLAS HALLETT.

REFERENCES CITED

The following references are of record in the file of this patent:

UNITED STATES PATENTS

| Number | Name | Date |
|---|---|---|
| 2,201,204 | Runyan | May 21, 1940 |
| 2,307,259 | Fling | Jan. 5, 1943 |
| 2,352,778 | Eddy | July 4, 1944 |
| 2,426,241 | Rodman | Aug. 26, 1947 |